United States Patent Office 3,406,170
Patented Oct. 15, 1968

3,406,170
2-HALO-GUANIDINES
Anthony J. Papa, Claymont, Del., assignor to E. I du Pont de Nemours and Company, Wilmington, Del., a corporation of Delaware
No Drawing. Filed July 29, 1965, Ser. No. 475,849
11 Claims. (Cl. 260—246)

ABSTRACT OF THE DISCLOSURE

This invention is concerned with new compounds of the basic guanidine structure having the structural formula,

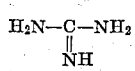

wherein the guanidine compounds are tetrasubstituted in the imino nitrogen atoms and are 2-halotetrasubstituted in that a chlorine, bromine, or iodine atom replaces the hydrogen atom on the imino nitrogen atom. These compounds are prepared by reacting a tetrasubstituted guanidine with chlorine, bromine, or iodine in an inert liquid. The compounds are useful as intermediates.

---

This invention concerns a new class of chemical compounds and more particularly it relates to 2-halotetrasubstituted guanidines and the preparation thereof.

The new compounds of this invention are generically termed 2-halotetrasubstituted guanidines and correspond to any tetrasubstituted guanidine in which a chlorine, bromine or iodine atom replaces the hydrogen atom on the imino nitrogen atom. Thus, the new compounds of this invention are of the basic guanidine structure (i.e.

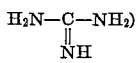

but are tetrasubstituted in that other radicals replace both hydrogen atoms on each of the amino (i.e. —$NH_2$) nitrogen atoms and, additionally, are 2-halotetrasubstituted guanidines in that a chlorine, bromine, or iodine atom replaces the hydrogen atom on the imino (i.e. =NH) nitrogen atom.

Particularly contemplated compounds of this invention have the structural formula Z=NX (Formula 1) in which X is a chlorine, bromine, or iodine atom and Z is a radical having the structural formula,

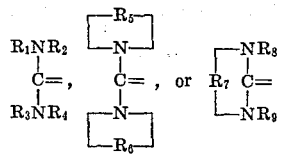

in which $R_1$, $R_2$, $R_3$, $R_4$, $R_8$, and $R_9$ are individually $C_1$–$C_5$ alkyl radicals, substituted $C_1$–$C_5$ alkyl radicals, phenyl radical or a substituted phenyl radical; $R_5$ and $R_6$ are individually either a $C_2$–$C_6$ alkylene radical or a $C_2$–$C_6$ alkylene radical containing a hetero oxygen, sulfur or $C_1$–$C_5$ alkyl substituted nitrogen (e.g.

atom; and $R_7$ is a $C_2$–$C_6$ alkylene radical. As used in this invention the term "$C_1$–$C_5$ alkyl radical" means a saturated univalent aliphatic hydrocarbon radical having one to five carbon atoms inclusive. This, of course, includes straight chain radicals such as methyl, ethyl, propyl, etc., and additionally the branched isomers thereof such as isopropyl, isobutyl, sec-butyl, t-butyl, isoamyl, etc. The alkylene chain radicals are bivalent radicals such as ethylene, trimethylene, tetramethylene, pentamethylene, etc. The term "substituted alkyl radical" means that not more than three hydrogen atoms of the alkyl radical have been replaced by one of the following substituent groups (Y):

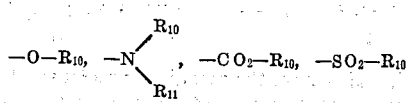

where $R_{10}$ and $R_{11}$ are $C_1$–$C_5$ alkyl or phenyl radicals and may be the same or different. The term "substituted phenyl radical" means that not more than three hydrogen atoms on the aromatic ring are individually replaced by a substituent group (Y) or a Cl, Br, F, —$NO_2$, or $C_1$–$C_5$ alkyl group.

The 2-halotetrasubstituted guanidines of this invention can be prepared by reacting, as starting materials, a tetrasubstituted guanidine with chlorine, bromine, or iodine. It is usually desirable that the starting materials be dissolved in or diluted with an inert liquid and gradually admixed with continuous stirring. The reaction can be accomplished at atmospheric pressure and at a temperature below the decomposition temperature of the halogenated guanidine product. In this respect it has been noted that the chloro derivatives are generally the most stable while the bromo and iodo derivatives have respectively less stability. More particularly the reaction is usually readily accomplished at temperatures below 50° C. and especially good yields are obtained when the reaction occurs at less than 10° C. There appears to be no practical advantage in operating at temperatures below —20° C. Additionally it has been discovered that the new compounds of this invention decompose in the presence of water and/or ultraviolet light. Thus, it is usually desirable that the reaction be carried out under substantially anhydrous conditions, and in the absence of ultraviolet light. However, when the 2-halo guanidine product corresponds to the above structure wherein Z is

its decomposition in water is found to occur slowly. Thus, it has been discovered that this type of 2-halotetrasubstituted guanidine is most conveniently prepared by reacting the corresponding guanidinium hydrohalide in an aqueous solution with a halogenating agent.

Most well known solvents and diluents for the reactants can be used so long as they do not interfere with the reaction. Thus, solvents and diluents containing active hydrogen atoms have been found to be not suitable. However, many halogenated and aromatic hydrocarbons such as chloroform, dichloromethane, and benzene can be used conveniently. In particular carbon tetrachloride has been used effectively.

Useful halogenating agents are solutions of elemental chlorine, bromine, and iodine in suitable solvents. Other halogenating agents can also be used effectively in the reaction. Suitable examples of these are organic hypohalites and organic N-halo(-imides, -amides, and -amines). However, for these latter halogenating agents to be useful, it is frequently necessary to impose additional restrictions on the above presented reaction conditions. Thus, for t-butyl hypochlorite to be used effectively, the reaction solution temperature must be maintained not only below the product decomposition temperature, but also below the reaction temperature of the halogenated guanidine product with any alcohol generated in the halogenating reaction. When the reaction is carried out in an aqueous solution of a guanidinium hydrohalide, the inorganic hypohalites, particularly sodium, have been used effectively as a halogenating agent.

Using the previous described conditions, 2-halotetrasubstituted guanidines are prepared by a reaction generally represented as $$2Z=NH + 2X \longrightarrow Z=NX + Z=NH \cdot HX$$
$$\quad\quad I \quad\quad\quad\quad\quad\quad II \quad\quad III$$

wherein, Z and X have the meanings previously described, and wherein I is a tetrasubstituted guanidine, II is the N-halotetrasubstituted guanidine product, and III is a tetrasubstituted guanidinium hydrohalide by-product. Separation of the desired 2-halotetrasubstituted guanidine product from the hydrohalide by-product is accomplished by known techniques, such as filtration, followed by purification steps. Typical compounds of this invention along with their structural formulas are as follows; (it being understood that where the symbol X or the term "halo" appears either Cl (chloro), Br (bromo), or I (iodo) can be inserted)

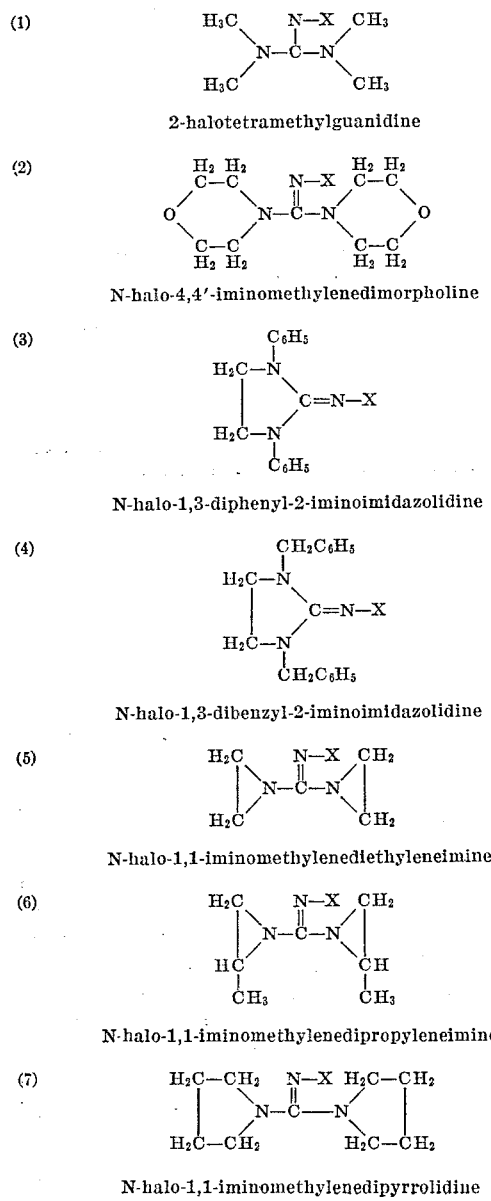

(1) 2-halotetramethylguanidine (2) N-halo-4,4'-iminomethylenedimorpholine (3) N-halo-1,3-diphenyl-2-iminoimidazolidine (4) N-halo-1,3-dibenzyl-2-iminoimidazolidine (5) N-halo-1,1-iminomethylenediethyleneimine (6) N-halo-1,1-iminomethylenedipropyleneimine (7) N-halo-1,1-iminomethylenedipyrrolidine (8) 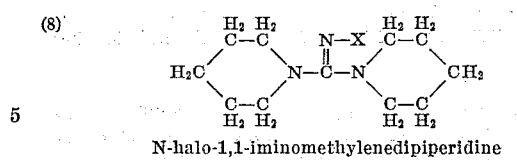
N-halo-1,1-iminomethylenedipiperidine (9) 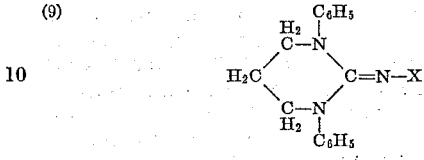
N-halo-1,3-diphenyl-2-iminotetrahydropyrimidine In addition to the compounds previously recited, other compounds of this invention are: 2-halotetrapropylguanidine, N - halo - 1,3 - diethyl - 2 - iminoimidazolidine, 2 - halo - tetra(dimethylaminomethyl)guanidine, 2-halo - 1,3 di(dipropylaminomethyl) - 1,3 - dimethylguanidine, N - halo - 1,3 di(dimethylaminomethyl)- 2 - iminoimidazolidine, 2 - halo - tetramethoxymethyl-guanidine, 2 - halo - 1,1 - dimethoxymethyl - 3,3 - dimethylguanidine, N - halo - 1,3 - dimethoxymethyl - 2-iminotetrahydropyrimidine, N - halo - 4,4' - iminomethylenedithiomorpholine, N - halo - 1,1' - iminomethylene - di(4,4'dimethyl)piperazine, 2 - halo - 1,1, 3,3 - tetra(carbomethoxymethyl) guanidine, 2 - halo-1,3 - dimethyl - 1,3 - di(methylsulfonylmethyl)guanidine, 2 - halo - 1,3 - dimethyl - 1,3 - diphenylguanidine, 2-halo - 1,3 - dimethyl - 1,3 - di(p-chlorophenyl)guanidine, 2 - halo - 1,1,3,3 - tetraphenylguanidine, 2 - halo - 1,1, 3,3 - tetra(p - methylphenyl)guanidine, 2 - halo - 1,3-dimethyl-1,3-di(p-nitrophenyl)guanidine.

The following examples illustrate the preparation of several of the compounds of this invention.

Example 1.—2-chlorotetramethylguanidine

Liquid chlorine (22.8 ml.; 0.5 mole) in 30 ml. of carbon tetrachloride was added to a solution of 115 g. (1 mole) of 1,1,3,3,-tetramethylguanidine in 700 ml. of carbon tetrachloride with vigorous stirring while maintaining the reaction temperature at 0° to −10° C. by means of a cooling bath. After complete addition, the mixture was allowed to come to room temperature by removing the cooling bath. When the reaction mixture had been stirred at ambient temperature for 1 hour, 1,1,3,3,-tetramethylguanidinium hydrochloride precipitated and was collected by filtration, washed with fresh solvent and dried.

The filtrate from the original reaction mixture was evaporated under reduced pressure and afforded a crude pale yellow oil which was fractionally distilled to furnish a very pale yellow liquid, B.P. 50° (0.1 mm.). Infrared spectral analysis, proton magnetic resonance analysis, and elemental analysis showed this liquid to have the structure of 2-chlorotetramethylguanidine. The yield was 57.1 g. (76%).

Analysis.—Calcd. for $C_5H_2N_3Cl$: Cl, 23.70. Found: Cl, 23.35.

Example 2.—2-bromotetramethylguanidine

To a solution of 46.1 g. (0.04 mole) of tetramethylguanidine in 200 ml. of carbon tetrachloride at −10° was added a solution of 32 g. (0.2 mole) of bromine in 50 ml. of carbon tetrachloride during a period of 0.5 hour while maintaining the temperature of the reaction mixture at 0° to −10° C. After complete addition the mixture was stirred at 0° C. for one hour. Tetramethylguanidine hydrobromide precipitated and was collected by filtration and crystallized from ethanol ether and dried.

The filtrate from the original reaction mixture was concentrated under reduced pressure and the residue distilled in vacuo. Elemental analysis showed the distillate to be 2-bromotetramethylguanidine, B.P. 72°/0.35 mm. The yield was 22.8 g. (59%).

*Analysis.*—Calcd. for $C_5H_{12}BrN_3$: Br, 41.18. Found: Br, 39.88.

Example 3.—N-chloro-4,4'-iminomethylenedimorpholine by the direct chlorination procedure To 39.9 g. (0.20 mole) of 4,4' - iminomethylenedimorpholine in 450 ml. of carbon tetrachloride was added a solution of 4.6 ml. (0.1 mole) of liquid chlorine in 30 ml. of carbon tetrachloride over 45 minutes, while maintaining the temperature by means of a cooling bath at —5° to 5° C. After complete addition the cooling bath was removed and the reaction mixture was allowed to come to ambient temperature. Solid 4,4' - iminomethylenedimorpholine hydrochloride precipitated and was collected by filtration, washed with solvent and dried.

The filtrate from the original reaction mixture was concentrated to an oily syrup at reduced pressure. On refrigeration the oil crystallized. The crystallized solid was analyzed and determined to be N-chloro-4,4'-iminomethylenedimorpholine, M.P. 52–54° C. The yield was 7.68 (33%).

Example 4.—N-chloro-4,4'-iminomethylenedimorpholine using organic hypochlorite t-Butyl hypochlorite (3.8 g.; 0.035 mole) was added to a stirred solution of 7.0 g. (0.035 mole) of 4,4'-iminomethylenedimorpholine in 130 ml. of carbon tetrachloride while maintaining the temperature at 5–10° C. After complete addition, the mixture was allowed to stir at 10° C. for 1 hour, filtered, and the filtrate evaporated under reduced pressure while not allowing the pot temperature to rise above 20° C. A residual oil was obtained which, on standing in the refrigerator, crystallized. After subsequent crystallization from benzene-petroleum ether, elemental analysis showed this solid to be N-chloro-4,4'-iminomethylenedimorpholine. M.P. 54.5–56.5° C. The yield was 5.8 g. (71%).

*Analysis.*—Calcd. for $C_9H_{16}ClN_3O_2$: C, 46.25; H, 6.90. Found: C, 47.76; H, 7.04.

Example 5.—N-chloro-1,3-diphenyl-2-imino-imidazolidine

A sodium hypochlorite solution was prepared using 6.0 g. NaOH, 4 ml. $Cl_2$ and 20 ml. water. This solution was added rapidly to 19.1 g. 1,3-diphenyl-2-iminoimidazolidine suspended in 250 ml. of water while maintaining the resultant solution temperature below 0° C. A solid precipitated and was rapidly filtered off and dried by suction filtration. Infrared spectral analysis of this solid established it to be N-chloro-1,3-diphenyl-2-iminoimidazolidine.

2-halotetrasubstituted guanidines are useful as starting materials for reactions with other compounds to form a variety of known useful compounds. Thus, the new compounds of this invention can be used to prepare β-cyano vinylamines, other ethylenically unsaturated compounds and saturated alkanes. Additionally N-triphenylphosphoranylidene - 4,4' - iminomethylenedimorpholidinium chloride, formed by the reaction of 2-chloro-4,4'-iminomethylenedimorpholine with triphenylphosphine in ether at room temperature, has been discovered to be useful as a secondary accelerator for SBR rubber.

β-Cyanovinylamines are a recently discovered class of ethylenes disclosed in Canadian Patent 653,727. These compounds are useful in producing copolymers containing basic dye sites. By the reaction of a 2-halotetrasubstituted guanidine with sodium azide in acetonitrile, a β-cyanovinylamine can be obtained. Furthermore, it has been discovered that if a substituted acetonitrile is used, the corresponding α-substituted-β-cyanovinylamine can be obtained. These α-substituted-β-cyanovinylamines are new compounds having similar utility to β-cyanovinylamines and can be conveniently prepared by the process herein described. All of the guanidine compounds of this invention in which the amino nitrogen atoms are not in the same ring can be utilized in the reaction forming either β-cyanovinylamine or α-substituted-β-cyanovinylamine. The reaction can be structurally represented as:

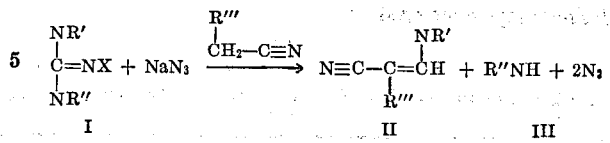

wherein, I is any 2-halotetrasubstituted guanidine disclosed by Formula 1 above in which the 1 and 3 nitrogen atoms are not in a single ring, II is the product β-cyanovinylamine or α-substituted-β-cyanovinylamine, and III is a by-product reaction eliminated amine usually of lower boiling point than the product amine.

When in the above reaction formula the radical substituent R''' is hydrogen, II is a β-cyanovinylamine. However, R''' can also represent other radicals and thus II can be an α-substituted-β-cyanovinylamine. The other radical substituents must be electron donating groups and include

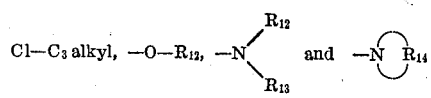

wherein $R_{12}$ and $R_{13}$ are individually $C_1$–$C_3$ alkyl and wherein $R_{14}$ is a $C_2$–$C_4$ alkylene chain radical or a $C_2$–$C_4$ alkylene chain radical containing a hetero oxygen atom.

The process for carrying out the reaction represented above is usually accomplished in two steps. Initially the 2-halotetrasubstituted guanidine and azide are reacted in the particular acetonitrile at a temperature below 50° C. and preferably above 0° C. This initial reaction is accompanied by the evolution of nitrogen and occasionally the by-product amine is also liberated in this step. However, when using most of the previously described guanidines it is subsequently necessary, in a separate step, to raise the temperature and thus liberate the by-product amine from the reaction solution. To avoid decomposition of the guanidine reactant, the solution temperature is not elevated until nitrogen has stopped evolving. The reaction is carried out under substantially anhydrous conditions and in the absence of ultraviolet light to avoid reactant decomposition. The relative amounts of starting materials are not critical, though it has been found desirable to use equal molar quantities of sodium azide and guanidine in sufficient acetonitrile to dissolve the solids. Example 6 below illustrates a desirable method for obtaining β-dimethylamino acrylonitrile.

Example 6

A mixture of 4.5 g. (0.03 mole) 2-chlorotetramethylguanidine and 2.0 g. (0.03 mole) sodium azide in 10 ml. of anhydrous acetonitrile were magnetically stirred at room temperature for twenty-four hours while protecting the reaction mixture from light by aluminum foil. Two moles of nitrogen gas evolved and sodium chloride precipitated. The sodium chloride was removed by filtration and the filtrate, analyzed as being 3,3-bis(dimethylamino) propionitrile, was subsequently concentrated under reduced pressure and then allowed to stand for forty-five minutes during which time dimethylamine evolved. Subsequent distillation of the filtrate furnished 1.9 g. (66%) of colorless product, B.P. 68–70° C. (0.2 mm.), $n_D^{25}=1.5337$. An analytical sample B.P. 47–48° C. (0.10 mm.) was then obtained by distillation through a 28" spinning band column and analyzed. The product was determined to be β-dimethylamino acrylonitrile.

*Analysis.*—Calcd. for $C_5H_8N_2$: C, 62.47; H, 8.39; N, 29.19. Found: C, 62.45; H, 8.85; N, 29.74.

Table I presents representative samples of other β-cyanovinylamines that are obtained by the process of this invention. All the reactions are initially carried out below 50° C. in acetonitrile with sodium azide and the corresponding halogenated tetrasubstituted guanidine. The table includes the respective guanidine reactant and the preferred second step temperature ranges for the elimination of the by-product amine and the recovery of the desired vinylamine product.

boiling amine by-product. Thus, if R″NH has a lower boiling point than R′NH, the β-cyanovinylamine product will correspond to

TABLE I

| 2-halotetrasubstituted guanidine | Temperature, °C. | β-Cyanovinylamine product |
|---|---|---|
| [morpholino derivative]₂ C=NX | 110–130 | β-Morpholino acrylonitrile. N—CH=CHCN (morpholino) |
| [pyrrolidino derivative]₂ C=NX | 85–90 | β-Pyrrolidino acrylonitrile. N—CH=CHCN (pyrrolidino) |
| [(C₆H₅)₂N]₂ C=NX | 180–190 | β-Diphenylamino acrylonitrile. (C₆H₅)₂NCH=CHCN |
| [(C₂H₅)₂N]₂ C=NX | 50–60 | β-Diethylamino acrylonitrile. (C₂H₅)₂NCH=CHCN |

If a nonsymmetrical 2-halotetrasubstituted guanidine is used (i.e., R′ and R″ are different), the particular β-cyanovinylamine product obtained will be that resulting from the elimination in the second step of the lowest

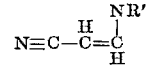

and the eliminated by-product amine will be R″NH. Table II is similar to Table I except that the 2-haloguanidine reactant is nonsymmetrical.

TABLE II

| 2-halotetrasubstituted guanidine | Temperature, °C. | β-cyanovinylamine product |
|---|---|---|
| (CH₃)₂N, (C₆H₅)₂N C=NX | 25–30 | (C₆H₅)₂N—CH=CHCN β-Diphenylamino acrylonitrile. |
| (CH₃)₂N, morpholino C=NX | 25–30 | morpholino-N—CH=CHCN β-Morpholino acrylonitrile. |
| (CH₃)₂N, pyrrolidino C=NX | 25–30 | pyrrolidino-NCH=CHCN β-Pyrrolidino acrylonitrile. |
| (C₆H₅)₂N, morpholino C=NX | 100–130 | (C₆H₅)₂N—CH=CHCN β-Diphenylamino acrylonitrile. |
| (CH₃)₂N, (C₂H₅)₂N C=NX | 25–30 | (C₂H₅)₂NCH=CHCN β-Diethylamino acrylonitrile. |

As stated previously when a substituted acrylonitrile is used in the above described reaction in place of acrylonitrile, the corresponding α-substituted-β-cyanovinylamine is formed. As with the reaction using acrylonitrile the process to form these new compounds usually is accomplished in two steps, the second of which frequently involves elevating the solution temperature to liberate the by-product amine. The particular reaction temperatures for this process are identical with the temperatures disclosed for the reactions using acrylonitrile. Thus, the first step is accomplished between 0° C. and 50° C. while the temperature of the second step is such as to liberate the by-product amine from the reaction solution. Furthermore, as with the acrylonitrile reaction the by-product amine liberated is dependent upon the particular 2-halotetrasubstituted guanidine reacted. Thus, the temperatures discovered as most useful in the second step of this process are identical with those of Tables I and II above when the same 2-haloguanidine reactant is employed. Table III below presents representative samples of the α-substituted-β-cyanovinylamines of this invention along with the corresponding substituted acrylonitrile, 2-haloguanidine reactant and second step temperature range.

TABLE III

| 2-halotetrasubstituted guanidine | α-Substituted acrylonitrile | Temperature, ° C. | α-Substituted-β-cyanovinylamine |
| --- | --- | --- | --- |
| [(CH₃)₂N—]₂C=NX | CH₂—CN, CH₃ | 20–40 | β-Dimethylamino-α-methyl acrylonitrile. |
| (CH₃)₂N, morpholino–C=NX | CH₂—CN, O, CH₃ | 25–30 | β-Morpholino-α-methoxyacrylonitrile. |
| (C₆H₅)₂N, morpholino–C=NX | CH₂—CN, pyrrolidino | 100–130 | β-Diphenylamino-α-pyrrolidinoacrylonitrile. |
| [(C₂H₅)₂N—]₂C=NX | CH₂—CN, N(C₂H₅)₂ | 50–60 | Bis-α,β-diethylaminoacrylonitrile. |
| [(C₆H₅)₂N—]₂C=NX | CH₂CN, morpholino | 180–190 | β-Diphenylamino-α-morpholinoacrylonitrile. |

11

Example 7 below sets forth a convenient method for forming β-dimethylamino-α-methylacrylonitrile, corresponding to the first of the α-substituted β-cyanovinylamines listed in Table III.

Example 7

35 ml. of propionitrile was added to a stirred mixture of 22.4 g. (0.15 mole) of 2-chlorotetramethyl guanidine and 11.1 g. (0.17 mole) of activated sodium azide. Subsequently, the reaction mixture was stired at 40–45° C. for five hours and then stirred for 12 hours at room temperature. Subsequently, the mixture was heated at 40° C. for three hours. Sodium chloride which precipitated was filtered off and the filtrate concentrated by subjecting it to reduced pressure (0.1 mm.) at room temperaure. The excess propionitrile was collected in a trap submerged in a Dry Ice-acetone cooling bath. The residue was quickly filtered over nitrogen and the filtrate distilled to give two fractions, one of which, 2.3 g. (14%) B.P. 58–65° C./0.1 mm. was determined by analytical, infrared and NMR analysis to be β-dimethylamino-α-methylacrylonitrile.

Analysis.—Calcd. for $C_6H_{10}N_2$: C, 65.42; H, 9.15. Found: C, 63.89; H, 8.93.

A process for oxidative condensation of activated compounds using 2-halotetrasubstituted guanidines of this invention has also been discovered. This process provides a convenient method for obtaining certain ethylenically unsaturated compounds (i.e., compounds having a

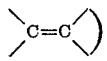

and saturated alkanes (i.e., compounds having a

or a

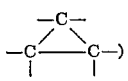

The activated compounds useful in this process are those represented structurally as:

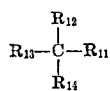

wherein, $R_{11}$, $R_{12}$, $R_{13}$, $R_{14}$ are each referred to as R substituent groups and one or two of the R substituents is hydrogen. The remaining R substituents must be strongly electron attracting groups, suitable examples of which are; nitro, sulfone, cyano, carbalkoxy (i.e., —COOR with R being a $C_1$–$C_5$ alkyl group), trifluoromethyl, phenyl and substituted phenyl group such as p-chlorophenyl, p-nitrophenyl, p-cyanophenyl and p-carbomethoxyphenyl. Thus, examples of activated compounds useful in the invention process are phenylacetonitrile, p-chlorophenylacetonitrile, p-nitrophenylacetonitrile, diphenylacetonitrile, bis(p-nitrophenyl) methane, ethyl cyanoacetate, diethyl malonate, and malononitrile.

The process can be carried out by reacting the activated compound with a 2-halotetrasubstituted guanidine in a substantially anhydrous solvent. Suitable solvents are benzene, tetrahydrofuran, and ethers such as diethylether. To obtain maximum yield, the optimum reaction temperature will differ for the various activated compounds, however all the reactions can conveniently occur between −25° C. and 50° C. It should also be understood that a solvent may not be necessary, particularly when the active hydrogen compound is in a liquid state at the reaction temperature. In carrying out the process, it is desirable, especially when the reaction is exothermic, to gradually add the guanidine, in solution, to a solution of the activated compound. In this manner the proper reaction temperature can be maintained. To obtain maximum yield, the times for the particular reactions vary widely from one day to as much as seven days. Also, as with other processes involving the 2-halotetrasubstituted guanidines, the reaction is preferably conducted in the absence of ultraviolet light to avoid decomposition of the guanidine.

Any 2-halotetrasubstituted guanidine can be used in the condensation reaction, however, 2-chlorotetramethylguanidine is preferred due to its ready availability. As stated before, using this process, activated compounds can be condensed to produce ethylenically unsaturated compounds and saturated alkanes. In general, activated methylene compounds (i.e., compounds wherein two of the substituents in the previously given structural formula are hydrogen) react to form ethylenically unsaturated compounds while methine compounds (i.e., only one of the substituents is hydrogen) and sterically hindered methylenes (e.g., bis(p-nitrophenyl)methane) react to form saturated alkanes. To effectuate the oxidative condensation process, the relative amounts of starting materials are not critical. However, satisfactory yields of ethylenically unsaturated compounds can be obtained by starting with equimolar amounts of the guanidine and activated compound while saturated alkanes are best obtained by reacting a 1 to 2 molar ratio of the guanidine to activated compound. The following example illustrates the oxidative condensation process of this invention.

Example 8

A reaction mixture was formed by adding 2-chlorotetramethylguanidine (15 g.; 0.1 mole) directly to a solution of 11.7 g. (0.1 mole) of phenylacetonitrile in 10 ml. of dry benzene at room temperature and in the dark. The reaction mixture was stirred for 2 hours and then allowed to stand for 6 days. Tetramethylguanidinium hydrochloride precipitated, and was filtered off and washed thoroughly with benzene.

The combined filtrate from the original reaction mixture and benzene washings was evaporated to give a solid residue which was washed with cold methanol and dried. Sublimation of the solid at 100–105°/0.01 mm. gave a white product which elemental analysis and physical properties showed to be α,α'-dicyanostilbene, M.P. 159° C. The yield was 2.6 g. (23%).

The following table sets forth examples of other oxidative condensation reactions that can be carried out by the above described process. The reactions are conveniently accomplished in the stipulated solvent and at the temperatures indicated using 2-chlorotetramethylguanidine as the starting 2-haloguanidine. Where no solvent is indicated, the reactions are found to occur readily without one. Conventional recovery and purification techniques can be used to obtain the final product, with a yield generally in the range from 20 to 60 percent.

TABLE IV

| Activated Compound | Solvent | Temp., ° C. | Product |
|---|---|---|---|
| Diethyl malonate | Benzene | 20–40 | Ethyl ethylenetetracarboxylate. |
| p-Chlorophenylacetonitrile. | None | 20–40 | 4,4'-dichloro-α,α'-dicyanostilbene. |
| p-Nitrophenylacetonitrile. | Benzene | 30–35 | 4,4'-dinitro-α,α'-dicyanostilbene. |
| Bis(p-nitrophenyl) methane. | None | 20–40 | Tetrakis (p-nitrophenyl) ethane. |
| Diphenylacetonitrile | Benzene | 40–50 | Tetraphenylsuccinonitrile. |
| Ethyl cyanoacetate | do | 15–20 | Triethyl 1,2,3-tricyanocyclopropane-1,2,3-tricarboxylate. |
| Malononitrile | Tetrahydrofuran. | −20–10 | Tetramethylguanidinium Pentacyanopropenide. |

An additional advantage of many of the 2-halotetrasubstituted guanidines of this invention is their usefulness as reactants to form a new class of compounds termed guanidinium azides. This new class of compounds and their methods of preparation are set forth in a co-pending application.

What is claimed is:

1. A 2-halotetrasubstituted guanidine having the structural formula $$Z=NX$$

wherein:
X is selected from the group consisting of Cl, Br, and I; and
Z is selected from the group consisting of radicals having the structural formula

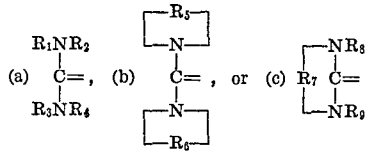

wherein:
$R_1$, $R_2$, $R_3$, $R_4$, $R_8$, and $R_9$ are individually selected from the group consisting of $C_1$–$C_5$ alkyl, (Y) substituted $C_1$–$C_5$ alkyl, phenyl, and (Y') substituted phenyl in which
(Y) is selected from the group consisting of

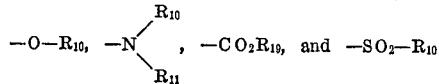

wherein $R_{10}$ and $R_{11}$ are individually selected from the group consisting of $C_1$–$C_5$ alkyl and phenyl and
(Y') is selected from the group consisting of Cl, Br, F, —$NO_2$, $C_1$–$C_5$ alkyl and (Y);
$R_5$ and $R_6$ are individually selected from the group consisting of $C_2$–$C_6$ alkylene radicals and $C_2$–$C_6$ alkylene radicals containing a hetero atom selected from the group consisting of oxygen, sulfur, and $C_1$–$C_5$ alkyl substituted nitrogen; and
$R_7$ is a $C_2$–$C_6$ alkylene radical.

2. A 2-halotetrasubstituted guanidine of claim 1 wherein $R_1$, $R_2$, $R_3$, $R_4$, $R_8$, and $R_9$ are individually selected from the group consisting of $C_1$–$C_5$ alkyl and phenyl and $R_5$ and $R_6$ are individually selected from the group consisting of $C_2$–$C_6$ alkylene and $C_2$–$C_6$ alkylene containing a hetero oxygen atom.

3. A 2-halotetrasubstituted guanidine of claim 2 wherein X is Cl.

4. A 2-halotetrasubstituted guanidine of claim 1 wherein Z is a radical having the structural formula (a).

5. A 2-halotetrasubstituted guanidine of claim 1 wherein Z is a radical having the structural formula (b).

6. A 2-halotetrasubstituted guanidine of claim 1 wherein Z is a radical having the structural formula (c).

7. 2-halotetramethylguanidine wherein the halo is selected from the group consisting of chloro, bromo and iodo.

8. 2-chlorotetramethylguanidine.

9. N-halo - 4,4' - iminomethylenedimorpholine wherein the halo is selected from the group consisting of chloro, bromo and iodo.

10. N-chloro-4,4'-iminomethylenedimorpholine.

11. N - halo-1,3-diphenyl - 2 - iminotetrahydropyrimidine wherein the halo is selected from the group consisting of chloro, bromo, and iodo.

References Cited

UNITED STATES PATENTS 2,654,720    10/1953    Cohen et al. _____ 260—564

NICHOLAS S. RIZZO, *Primary Examiner.*

JOSE TOVAR, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,176                                            October 15, 1968

Alexander R. Surrey et al.

It is certified that error appears in the above identified patent and that said Letters Patent are hereby corrected as shown below:

Column 8, line 17, "-4-[N-4-chlorophenyl)" should read -- -4-[N-(4-chlorophenyl) --. Column 9, lines 29 and 30, "1,4-dihydroquinolone" should read -- 1,4-dihydroquinoline --. Column 10, line 5, "-,4-dihydroquinoline" should read -- -1,4-dihydroquinoline --; line 12, "(2,4-dichlorobenzyl-4-imino-,4-" should read -- (2,4-dichlorobenzyl)-4-imino-1,4- --; line 20, "4-n-butoxylphenyl" should read -- 4-n-butoxyphenyl --; line 38, "(4-chlorobenzyl-4-imino" should read -- (4-chlorobenzyl)-4-imino --. Column 11, line 16, "1-(-chlorobenzyl)" should read -- 1-(2-chlorobenzyl) --.

Signed and sealed this 3rd day of March 1970.

(SEAL)
Attest:

Edward M. Fletcher, Jr.                          WILLIAM E. SCHUYLER, JR.

Attesting Officer                                       Commissioner of Patents